United States Patent

[11] 3,610,334

[72] Inventor Harold L. Sletten
 Northridge, Calif.
[21] Appl. No. 762,850
[22] Filed Sept. 26, 1968
[45] Patented Oct. 5, 1971
[73] Assignee North American Rockwell Corporation

[54] HEAT EXCHANGER
 10 Claims, 2 Drawing Figs.

[52] U.S. Cl. .................................................. 165/181,
 250/106
[51] Int. Cl. ..................................................... F28f 1/20
[50] Field of Search ......................................... 165/179-184,
 141, 154; 250/106 S; 176/81

[56] References Cited
UNITED STATES PATENTS

| | | | |
|---|---|---|---|
| 813,918 | 2/1906 | Schmitz | 165/141 |
| 2,869,836 | 1/1959 | Huet | 165/179 X |
| 3,260,652 | 7/1966 | Ritz et al. | 176/81 |

Primary Examiner—Lloyd L. King
Assistant Examiner—Theophil W. Streule
Attorneys—H. Fredrick Hamann and Donald J. Ellingsberg ABSTRACT: An improved heat exchanger that effects the transfer of heat between spaced-apart members that are thermally coupled by extended and interjacence surfaces of the members.

PATENTED OCT 5 1971

3,610,334

INVENTOR.
HAROLD L. SLETTEN

BY Donald J. Ellingsberg 3,610,334

HEAT EXCHANGER

BACKGROUND OF THE INVENTION

It is generally well known that a heat exchanger is a device that transfers heat from one place to another by thermal coupling, i.e. and by conduction, by convection, and by radiation, or any combination thereof.

Heat is mode of transfer of energy that is used in a conventional thermal or steam power plant. The heat is supplied to a steam-generator that generates steam which drives a turbine-generator. The heat energy added to the steam is partially converted to mechanical energy by thermodynamic expansion in the turbine, and the generator, which is coupled to the turbine, converts the mechanical energy into electrical energy or electricity.

Conventional steam power plants include fossil-fuel and nuclear power plants. While fossil-fuel steam power plants generate steam by the heat of combustion resulting from the burning of solid, liquid, or gaseous fuel, nuclear steam power plants use the heat of nuclear fission to generate steam. The thermal energy from the fission reaction is transferred as heat to water and produces steam which drives a turbine-generator set in a conventional manner.

Fission reactions occur in the nuclear fuel which is usually contained in one or more fuel assemblies that are positioned within a nuclear reactor core. The reactor core usually contains hundreds of fuel assemblies that have an economical operating life. When the capacity of the fuel assembly to generate or efficiently transfer heat declines, the fuel assembly is removed from the reactor core by special fuel handling machines and a new fuel assembly is positioned in the core. However, the removed fuel assembly continues to generate heat, i.e., heat produced by the decay of the radioactive fission products, and this decay heat must be transferred to prevent system damage.

Conventional fuel handling systems include various methods for enhancing the transfer of decay heat from the fuel assembly. For example, in one operating nuclear power plant, the fuel assembly was positioned in a sodium-filled finned pot and the pot, which was removed from a sodium pool, was placed in a cask car that carried the fuel assembly/pot to a decay storage area. In the car, decay heat from the fuel assembly, and thus from the finned pot, was transferred to an inert gas atmosphere. The gas atmosphere was force circulated in a closed cycle which included an external heat exchanger integral with the cask car. However, this force circulated gas atmosphere carried residual sodium that had clung to the cask exterior throughout the system and deposited the sodium on the heat exchange surfaces. This blocked the flow of the gas and impaired heat transfer characteristics. Unless a solution could be provided for this particular problem, damage to the system from the buildup of decay heat (approximately eight kilowatts) would continue.

OBJECTS OF THE INVENTION

Accordingly, it is an object of the invention to provide a new and improved heat exchanger.

It is an object of the invention to provide an improved heat exchanger for the transfer of heat primarily by natural convection.

SUMMARY OF THE INVENTION

Briefly, in accordance with one form of the invention, a new and improved heat exchanger is provided having an inner member cooperating with a heat source and generally telescoped within an outer member functioning as a heat sink. The inner member has a plurality of outwardly directed extended surfaces that are maintained in an interadjacent relationship with a plurality of inwardly directed extended surfaces of the outer member so that heat is transferred primarily through radiative and natural convective thermal coupling between the inner and outer members.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawing.

DESCRIPTION OF THE INVENTION

Figure 1:
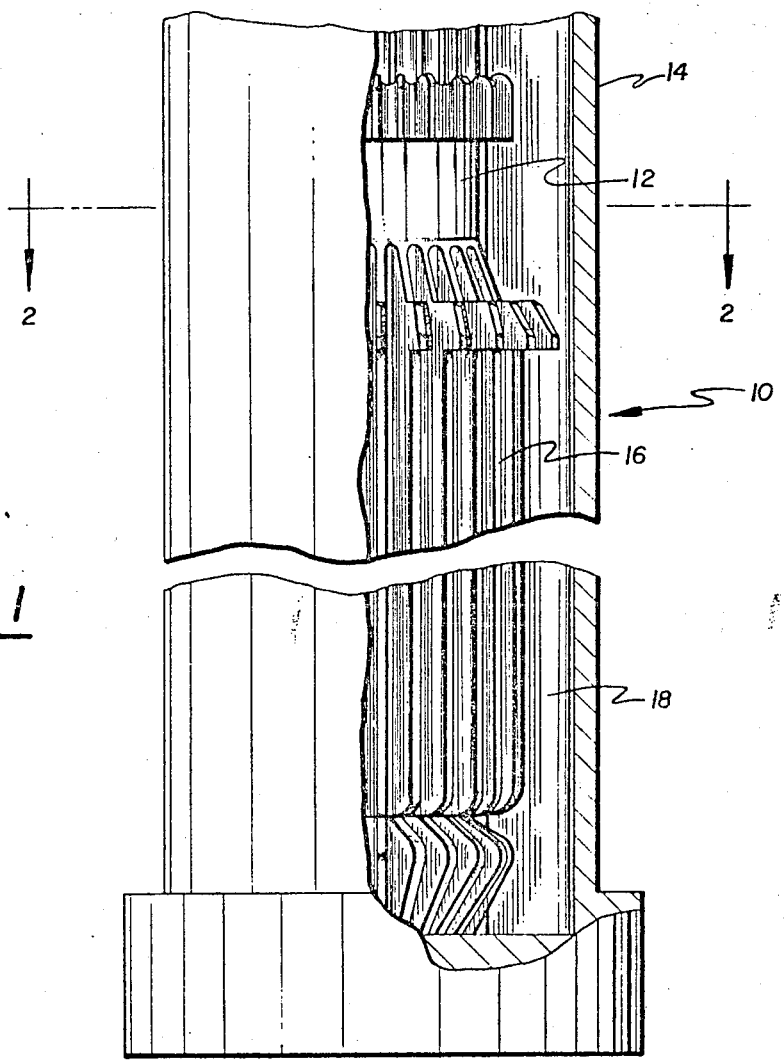
FIG. 1 is a front view, partly broken away and partly sectional, of the heat exchanger of the invention.
Figure 2:
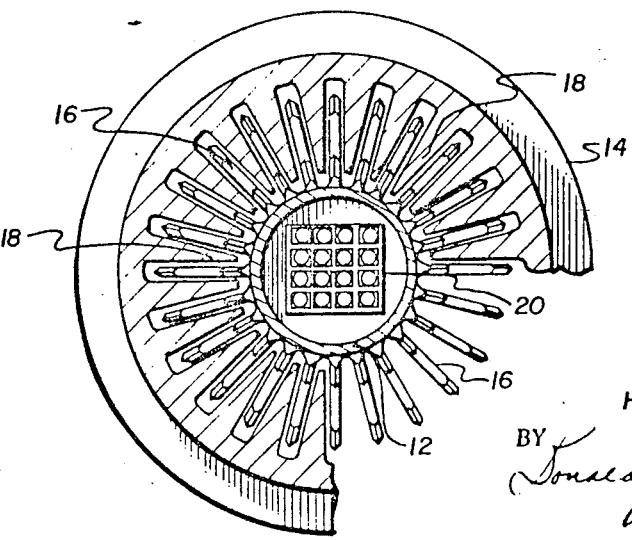
FIG. 2 is a sectional view, partly broken away, along the line 2—2 of FIG. 1.

The heat exchanger 10 of the invention as shown by FIGS. 1 and 2 has an inner member 12 positioned or telescoped within an outer member 14.

The inner member 12 has a plurality of similar outwardly directed extended surfaces that in heat exchanger 10 have the form of similar fins 16 that are circumferentially spaced apart since the inner member is a hollow right cylinder as shown. The outer member 14 has a plurality of similar inwardly directed extended surfaces that in heat exchanger 10 have the form of smaller fins 18 that are circumferentially spaced apart since the outer member is also a hollow right cylinder that receives the inner member 12 in a telescopic manner.

The outwardly directed fins 16 of the inner member 12 are maintained in a spaced-apart or interadjacent relationship with the inwardly directed fins 18 of the outer member 14 as shown by FIG. 2. When the inner member 12 is thermally coupled to a heat source, such as a fuel assembly 20 containing radioactive fuel, heat energy is transferred from the outwardly directed fins 16 to the interadjacent inwardly directed fins 18 by thermal radiative and natural convective thermal coupling. The outer member 14 can be the end heat sink or can be thermally coupled to a separate heat sink (not shown but considered conventional, e.g. a separate heat exchanger). However, it is contemplated that the outer member 14 can be thermally coupled to a heat source while the inner member 12 is coupled to a heat sink.

Thermal coupling of the fuel assembly 20 to the inner member 12 can be enhanced by the introduction of a fluid such as liquid metal, e.g. sodium (Na), into the inner volume defined by the inner member so that the fuel assembly is substantially covered by the fluid.

As will be evidenced from the foregoing description, certain aspects of the invention are not limited to the particular details of construction as illustrated, and it is contemplated that other modifications and applications will occur to those skilled in the art. It is contemplated that in certain operating conditions, e.g., where there is an absence of liquid metal such as sodium, that forced convection can be used to further enhance the natural convective thermal coupling between the interadjacent fins. It is, therefore, intended that the appended claims shall cover such modifications and applications that do not depart from the true spirit and scope of the invention.

I claim:

1. An improved heat exchanger for use with a heat source, the heat exchanger comprising:
   a. first means thermally coupled to the heat source,
   b. first extended surface means extending from said first means,
   c. heat sink means spaced apart from said first means, and
   d. heat sink extended surface means extending from said heat sink means,
   e. said first extended surface means and said heat sink extended surface means maintained in an interadjacent relationship so that heat originating from the heat source passes substantially through convective and radiative coupling from said first extended surface means to said heat sink extended surface means.

2. The improved heat exchanger of claim 1 in which said heat sink means generally encloses said first means.

3. The improved heat exchanger of claim 1 in which said first means generally encloses said heat sink means.

4. The improved heat exchanger of claim 1 in which respective ones of said first means and said heat sink means are maintained in a telescopic relationship.

5. The improved heat exchanger of claim 4 in which said first means and said heat sink means are generally cylindrical means.

6. The improved heat exchanger of claim 1 in which said first extended surface means are fin means.

7. The improved heat exchanger of claim 1 in which said heat sink extended surface means are fin means.

8. The improved heat exchanger of claim 1 in which said heat sink means includes a fluid means in fluid contact with said first extended surface means and said heat sink extended surface means so that heat originating from the heat source passes through said fluid means from said first extended surface means to said heat sink extended surface means.

9. The improved heat exchanger of claim 8 in which said fluid means is a liquid.

10. The improved heat exchanger of claim 9 in which said liquid is a liquid metal.